(12) United States Patent
Tayebati et al.

(10) Patent No.: US 7,352,968 B2
(45) Date of Patent: Apr. 1, 2008

(54) CHIRPED MANAGED, WAVELENGTH MULTIPLEXED, DIRECTLY MODULATED SOURCES USING AN ARRAYED WAVEGUIDE GRATING (AWG) AS MULTI-WAVELENGTH DISCRIMINATOR

(75) Inventors: Parviz Tayebati, Weston, MA (US); Daniel Mahgerefteh, Los Angeles, CA (US); Kevin McCallion, Charlestown, MA (US)

(73) Assignee: Finisar Corporation, Sunnyvale, CA (US)

( * ) Notice: Subject to any disclaimer, the term of this patent is extended or adjusted under 35 U.S.C. 154(b) by 627 days.

(21) Appl. No.: 11/016,020

(22) Filed: Dec. 17, 2004

(65) Prior Publication Data
US 2005/0163512 A1 Jul. 28, 2005

Related U.S. Application Data

(63) Continuation-in-part of application No. 10/680,607, filed on Oct. 6, 2003, now Pat. No. 7,054,538, and a continuation-in-part of application No. 10/615,218, filed on Jul. 8, 2003, now Pat. No. 7,263,291, and a continuation-in-part of application No. 10/289,944, filed on Nov. 6, 2002, now Pat. No. 6,963,685.

(60) Provisional application No. 60/531,656, filed on Dec. 22, 2003, provisional application No. 60/530,479, filed on Dec. 17, 2003.

(51) Int. Cl.
*H04B 10/04* (2006.01)
*H04J 14/02* (2006.01)

(52) U.S. Cl. .................. 398/87; 398/185; 398/186; 398/187; 398/201

(58) Field of Classification Search .............. 298/87, 298/91–92, 201, 185–187
See application file for complete search history.

(56) References Cited

U.S. PATENT DOCUMENTS

| | | | |
|---|---|---|---|
| 3,324,295 A | 6/1967 | Harris | |
| 4,561,119 A | 12/1985 | Epworth | |
| 4,805,235 A | 2/1989 | Henmi | |
| 4,841,519 A | 6/1989 | Nishio | |
| 5,412,474 A | 5/1995 | Reasenberg et al. | |
| 5,416,629 A | 5/1995 | Huber | |
| 5,737,104 A | 4/1998 | Lee et al. | |
| 5,920,416 A | 7/1999 | Beylat et al. | |
| 6,104,851 A | 8/2000 | Mahgerefteh | |
| 6,115,403 A | 9/2000 | Brenner et al. | |
| 6,298,186 B1 | 10/2001 | He | |
| 6,331,991 B1 | 12/2001 | Mahgerefteh | |
| 6,748,133 B2 | 6/2004 | Liu et al. | |
| 6,963,685 B2 | 11/2005 | Mahgerefteh et al. | |
| 7,054,538 B2 | 5/2006 | Mahgerefteh et al. | |
| 2002/0154372 A1* | 10/2002 | Chung et al. | ............... 359/182 |
| 2004/0096221 A1 | 5/2004 | Mahgerefteh et al. | |
| 2005/0175356 A1 | 8/2005 | McCallion et al. | |

FOREIGN PATENT DOCUMENTS

GB 2107147 A 4/1983

OTHER PUBLICATIONS

Brent E. Little, Advances in Microring Resonators, Integrated Photonics Research Conference 2003.
Chang-Hee Lee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.
P.J. Corvini et al., Computer Simulation of High-Bit-Rate Optical Fiber Transmission Using Single-Frequency Lasers, Journal of Lightwave Technology, Nov. 1987, 1591-1595, vol. LT-5, No. 11.
Hamutal Shalom et al., On the Various Time Constants of Wavelength Changes of a DFB Laser Under Direct Modulation, IEEE Journal of Quantum Electronics, Oct. 1998, pp. 1816-1822, vol. 34, No. 10.
Yuan P. Li. et al., Chapter 8: Silicon Optical Bench Waveguide Technology, Optical Fiber Communications, 1997, 319-370, vol. IIIB, Lucent Technologies, New York.
T.L. Koch et al., Nature of Wavelength Chirping in Directly Modulated Semiconductor Lasers, Electronics Letters, Dec. 6, 1984, 1038-1039, vol. 20, No. 25/26.

\* cited by examiner

An Arrayed grating waveguide used to multiplex frequency modulated signals as well as convert FM to AM.

Primary Examiner—Leslie Pascal
(74) Attorney, Agent, or Firm—Workman Nydegger

(57) ABSTRACT

There is provided a fiber optic system comprising:
- a multi-wavelength source adapted to generate frequency modulated signals having different wavelengths, $\lambda_1, \lambda_2, \ldots, \lambda_n$; and
- an arrayed waveguide grating adapted to convert the multiplicity of frequency modulated signals into a multiplicity of substantially amplitude modulated signals, and spatially combine the different wavelengths $\lambda_1, \lambda_2, \ldots, \lambda_n$.

And there is provided a method for transmitting an optical signal through a fiber comprising:
- operating a multi-wavelength source so as to generate frequency modulated signals having different wavelengths, $\lambda_1, \lambda_2, \ldots, \lambda_n$;
- passing the frequency modulated signals through an arrayed waveguide grating so as to convert the frequency modulated signals into substantially amplitude modulated signals, and spatially combine the different wavelengths $\lambda_1, \lambda_2, \ldots, \lambda_n$; and
- passing the substantially amplitude modulated signals into the fiber.

And there is provided a fiber optic system comprising:
- a multi-wavelength source adapted to generate frequency modulated signals having different wavelengths, $\lambda_1, \lambda_2, \ldots, \lambda_n$; and
- a beam combiner adapted to spatially combine the signals having different wavelengths and pass them into a periodic optical spectrum reshaper (OSR) to generate a plurality of substantially amplitude modulated signals having wavelengths $\lambda_1, \lambda_2, \ldots, \lambda_n$.

17 Claims, 5 Drawing Sheets

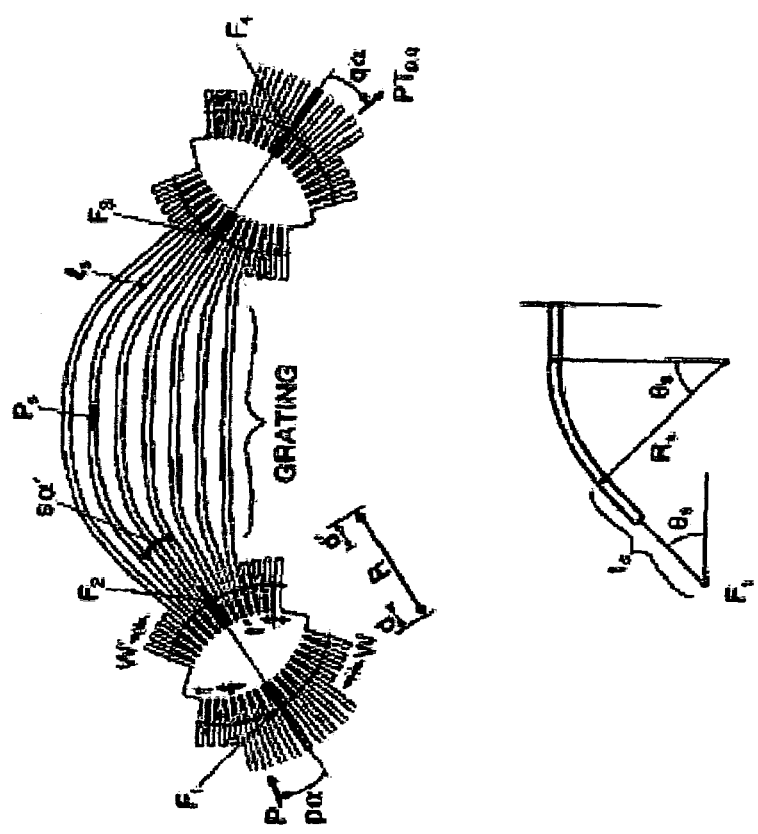

Fig. 1. $N \times N$ multiplexer consisting of two identical couplers and $M$ waveguides of lengths $l_1, \cdots, l_M$. The grating is a symmetric arrangement of waveguides having length $l_s$. Each half consists of three sections, respectively composed of radial, circular, and parallel (equispaced) waveguides. The total length of the $s$th waveguide is $l_s = 2R_s(\theta_s - \sin \theta_s) + 2l_s(1 - \cos \theta_s) + h_o$ where $h_o$ is a constant and $R_s$ is the $s$th radius of curvature.

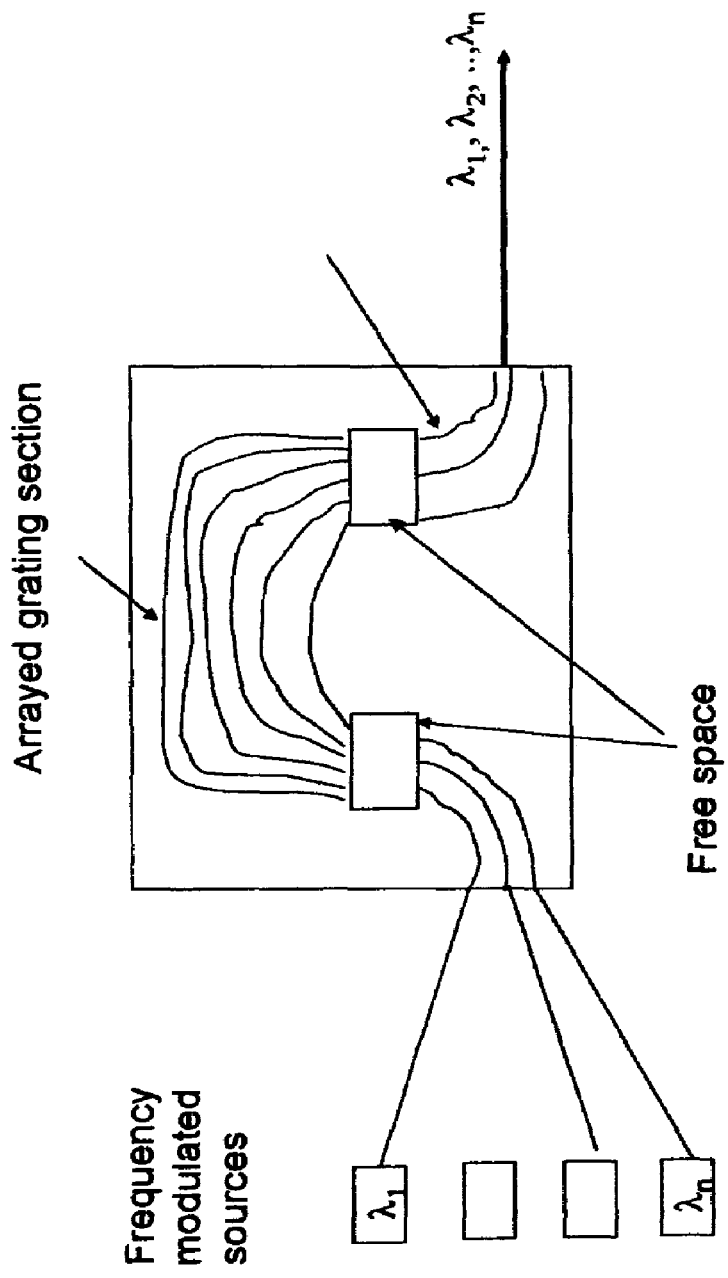
Fig. 2. An Arrayed grating waveguide used to multiplex frequency modulated signals as well as convert FM to AM.

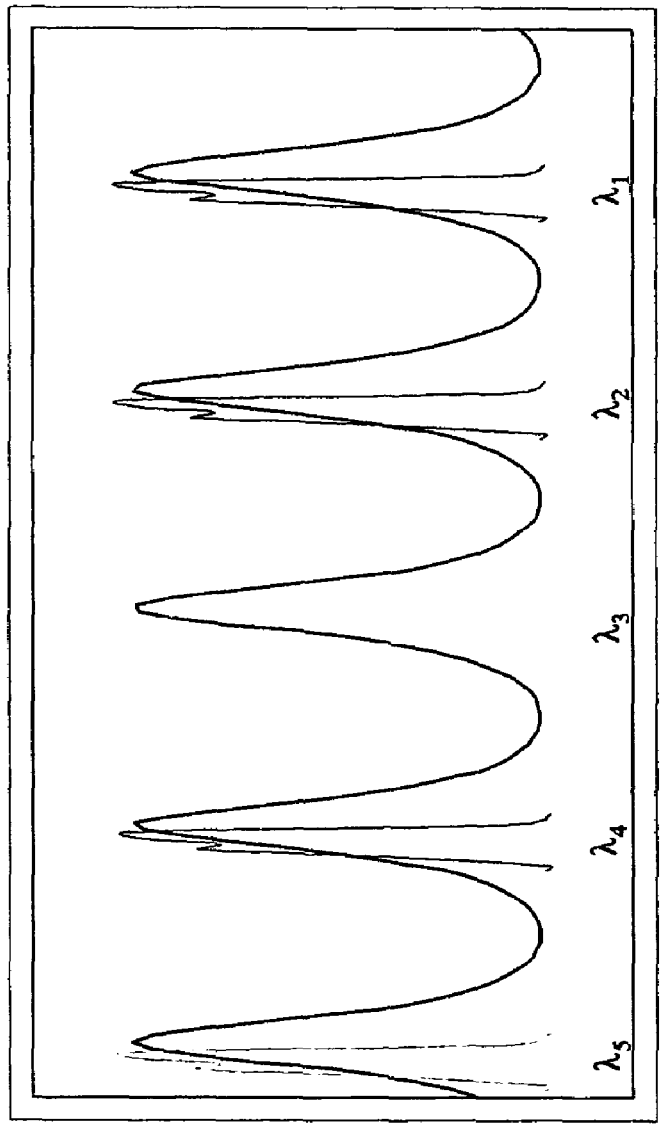
Fig. 3. Spectral response of the AWG and the spectra of the input frequency modulated signals at the various wavelengths.

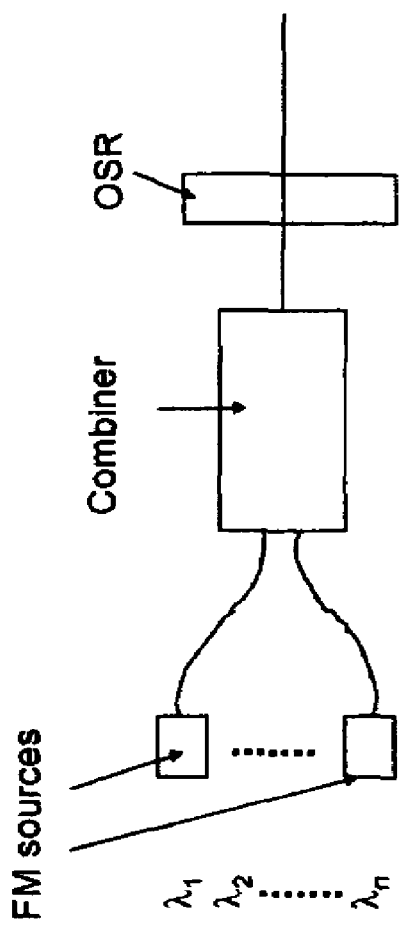
Fig. 4. Multi-wavelength source comprising wavelength combiner and optical spectrum reshaper.

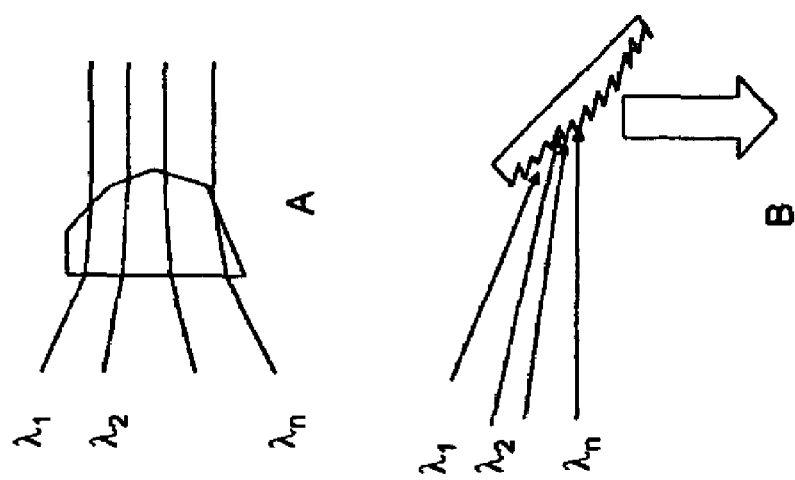
Fig. 5. Multifaceted prism and diffraction grating used as wavelength combiners.

CHIRPED MANAGED, WAVELENGTH MULTIPLEXED, DIRECTLY MODULATED SOURCES USING AN ARRAYED WAVEGUIDE GRATING (AWG) AS MULTI-WAVELENGTH DISCRIMINATOR

REFERENCE TO PENDING PRIOR PATENT APPLICATIONS

This patent application is:

(i) a continuation-in-part of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM;

(ii) a continuation-in-part of prior U.S. patent application Ser. No. 10/615,218, filed Jul. 8, 2003 now U.S. Pat. No. 7,263,291 by Daniel Mahgerefteh et al. for WAVELENGTH DIVISION MULTIPLEXING SOURCE USING MULTIFUNCTIONAL FILTERS;

(iii) a continuation-in-part of prior U.S. patent application Ser. No. 10/680,607, filed Oct. 6, 2003 now U.S. Pat. No. 7,054,538 by Daniel Mahgerefteh et al. for FLAT DISPERSION FREQUENCY DISCRIMINATOR (FDFD);

(iv) claims benefit of now abandoned prior U.S. Provisional Patent Application Ser. No. 60/530,479, filed Dec. 17, 2003 by Daniel Mahgerefteh et al. for OPTICAL TELECOMMUNICATION SYSTEM; and (v) claims benefit of now abandoned prior U.S. Provisional Patent Application Ser. No. 60/531,656, filed Dec. 22, 2003 by Parviz Tayebati et al. for CHIRPED MANAGED WAVELENGTH MULTIPLEXED DIRECTLY MODULATED SOURCES USING AN AWG AS MULTI-WAVELENGTH DISCRIMINATOR.

The five above-identified patent applications are hereby incorporated herein by reference.

FIELD OF THE INVENTION

This invention relates to signal transmissions in general, and more particularly to the transmission of optical signals.

BACKGROUND OF THE INVENTION

One of the key advantages of fiber optics is that different wavelength channels traveling in the same fiber have very little interference. This allows the use of wavelength division multiplexed (WDM) systems, in which data is carried by several optical carriers, each having a different wavelength. Each wavelength channel is generated by an independent laser source modulated separately with different data, hence increasing the total amount of data transmitted. These wavelength channels need to be spatially combined into the same fiber. An arrayed waveguide grating (AWG) accomplishes this task.

A system for long-reach lightwave data transmission through optical fibers has been described in U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM, which patent application is hereby incorporated by reference. Azna LLC of Wilmington, Mass. sometimes refers to the transmitter apparatus of this patent application as a Chirp Managed Laser (CML™). In this system, a frequency modulated (FM) source is followed by an optical discriminator, also sometimes referred to as an optical spectrum reshaper (OSR), which converts frequency modulation into a substantially amplitude modulated (AM) signal and partially compensates for the dispersion in the transmission fiber. A number of optical discriminators are described in this patent application, including an arrayed waveguide grating (AWG).

Also, in U.S. patent application Ser. No. 10/615,218, filed Jul. 8, 2003 by Daniel Mahgerefteh et al. for WAVELENGTH DIVISION MULTIPLEXING SOURCE USING MULTIFUNCTIONAL FILTERS, which patent application is hereby incorporated herein by reference, a system is disclosed for combining several chirp managed laser sources into a single optical beam, whereby to achieve wavelength division multiplexing. In this patent application, optical filters function as the multiplexer as well as the optical discriminator responsible for converting the FM modulated signal from the source into the AM signal sent down the fiber.

SUMMARY OF THE INVENTION

In the present invention, we combine the utility of the arrayed waveguide grating (AWG) as both a multiplexer and an optical discriminator. Among other things, we describe an embodiment in which the AWG serves two independent functions to advantage: (i) the AWG is used to multiplex a number of frequency modulated sources with different wavelengths, and (ii) the AWG is used to simultaneously convert frequency modulation to a substantially amplitude modulated signal for each input wavelength. Significantly, with the present invention, a simple, low cost transmitter (such as a directly modulated laser) can achieve long reach. As an example, a distance of >200 km (at a speed of 10 Gb/s, in fiber having 17 ps/nm/km of dispersion) can be achieved. The AWG also eliminates the need for a separate optical discriminator in the case where chirp managed lasers are to be combined in a WDM system.

In one preferred form of the invention, there is provided a fiber optic system comprising:

a multi-wavelength source adapted to generate frequency modulated signals having different wavelengths, $\lambda_1, \lambda_2, \ldots, \lambda_n$; and an arrayed waveguide grating adapted to convert the multiplicity of frequency modulated signals into a multiplicity of substantially amplitude modulated signals, and spatially combine the different wavelengths $\lambda_1, \lambda_2, \ldots, \lambda_n$.

And in another preferred form of the invention, there is provided a method for transmitting an optical signal through a fiber comprising:

operating a multi-wavelength source so as to generate frequency modulated signals having different wavelengths, $\lambda_1, \lambda_2, \ldots, \lambda_n$;

passing the frequency modulated signals through an arrayed waveguide grating so as to convert the frequency modulated signals into substantially amplitude modulated signals, and spatially combine the different wavelengths $\lambda_1, \lambda_2, \ldots, \lambda_n$; and passing the substantially amplitude modulated signals into the fiber.

In another preferred embodiment of the present invention, a plurality of frequency modulated signals at wavelengths $\lambda_1, \lambda_2, \ldots, \lambda_n$ are first spatially combined into the same optical beam, and then the combined signals are passed through a periodic optical spectrum reshaper, where the frequency modulated signals are converted to substantially amplitude modulated signals.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 1 is an example of a prior art arrayed waveguide grating (AWG) construction from C. Dragone at al., Photonics Technol. Lett., Vol. 3, No. 10, at 896 (1991);

FIG. 2 shows an AWG used to (i) multiplex frequency modulated signals as well as to (ii) convert FM to AM;

FIG. 3 shows the spectral response of the AWG and the spectra of the input frequency modulated signals at various wavelengths;

FIG. 4 shows a beam combiner used to spatially combine several frequency modulated sources into an optical spectrum reshaper; and FIG. 5 illustrates two possible beam combiners (e.g., a multifaceted prism and a diffraction grating) which may be used in connection with the present invention.

DETAILED DESCRIPTION OF THE PREFERRED EMBODIMENTS

FIG. 1 is an example of a prior art AWG. In the prior art, this AWG is generally used as either (i) a multiplexer, in which a number of wavelength $\lambda_1, \ldots \lambda_n$ are input at n input ports and are combined into one output port, or (ii) as a demultiplexer, in which a number of wavelength inputs are separated into a number of output ports.

The operation of an AWG has been described in above-identified reference, as well as in I. P. Kaminov and T. L. Koch Eds., Optical Telecommunications IIIB, New York: Academic Press (1997), ch. 8, pp. 319-370. Briefly, an AWG consists of two star couplers connected by an array of waveguides that act like a grating. The input star coupler couples light from any input to all of the outputs. All of the input wavelengths impinge on all of the waveguides after the star coupler. The waveguide grating has a constant length difference between adjacent waveguides (FIG. 1). The output star coupler is a mirror image of the input star coupler. The linear length difference between the waveguides causes a wavelength-dependent tilt of the wave front of the lightwave in the grating waveguide and thus spatially shifts the input light to a wavelength-dependent position. In other words, the interference of the waves results in the constructive interference at the output ports for only certain wavelengths by design. The transfer function of the AWG is a periodic series of peaks with high extinction. The transmission function of the AWG near each peak can have various shapes: examples are a Gaussian shape or a flat-top shape.

In the present invention, and looking now at FIG. 2, (i) the outputs of a number of frequency modulated sources are combined using the AWG, while (ii) the edges of the AWG filter shape are used to simultaneously convert input frequency modulation to substantially amplitude modulated signal. An example of a frequency modulated source is a directly modulated laser such as a distributed feed-back laser.

With respect to this second use of the AWG (i.e., as an optical discriminator to convert the input FM signal to an output AM signal), FIG. 3 shows the relative spectral position of the input frequency modulated signals with respect to the transmission peaks of the AWG transfer function; the wavelengths of the FM signals are off-center from the transmission peaks of the AWG. In essence, for this purpose, the AWG is a periodic filter used as a discriminator. Conversion of the frequency modulated signal to a substantially amplitude modulated signal occurs when the input signal is near the edge of the transmission of the filter (here the AWG). In the common prior art usage of an AWG multiplexer, the multiplexed signals of wavelength $\lambda_1$, $\lambda_2, \ldots \lambda_n$, are spectrally centered on the peak transmission of the AWG. In the present invention, the operating point of each wavelength, $\lambda_k$, channel is chosen to be on the transmission edge of the corresponding AWG peaks near that wavelength $\lambda_k$. This off-center operating point introduces excess loss through the AWG but, significantly, has the benefit of increasing the transmission distance of the thus generated amplitude modulated signal through dispersive fiber, as described in U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM, which patent application is hereby incorporated herein by reference.

The spectral shape of the AWG near each wavelength channel, $\lambda_1, \ldots \lambda_n$ can be designed to have a Gaussian shape or be flat-topped. As described in prior U.S. patent application Ser. No. 10/680,607, filed Oct. 6, 2003 by Daniel Mahgerefteh et al. for FLAT DISPERSION FREQUENCY DISCRIMINATOR (FDFD), which patent application is hereby incorporated herein by reference, the spectral shape of the discriminator should be nearly Guassian for 10 Gb/s system. The bandwidth and the slopes are also defined and specified for a 10 Gb/s system in the aforementioned U.S. patent application Ser. No. 10/680,607. In this respect it should be appreciated that an AWG can be designed to have the desired slope and bandwidth for the bit rate of operation. In one embodiment, a 3 dB bandwidth of ~0.8 times to 1.2 times the bit rate (~12 GHz for 10 Gb/s), and slopes of 0.8 dB/GHz to 2 dB/GHz, is needed for a 10 Gb/s system.

In another example, a number of 2.5 Gb/s directly modulated lasers are combined with an AWG. The AWG is used at the edges of the transmission profile so as to appropriately convert the frequency modulated signal to the desired amplitude modulated signal. The bandwidth reduction generated from the discriminator produces a narrow spectral shape which makes it possible to combine closely spaced wavelengths without substantial crosstalk. For the case of 2.5 Gb/s directly modulated lasers, where thermal chirp of the directly modulated laser can cause pattern dependence, a flat-topped filter with an operating slope (of the 1 bits) of <0.2 dB/GHz, is desired. It should be noted that the directly modulated lasers are operated high above threshold such that the transient chirp is reduced and the frequency modulation is substantially adiabatically chirped, as described in the aforementioned U.S. patent application Ser. No. 10/680,607. Slopes of >2 dB/GHz are also desired for the case of 2.5 Gb/s directly modulated lasers.

The signals of different wavelength can be generated by a multiplicity of distributed feedback (DFB) lasers disposed in separate packages. However, the source may also be a multi-wavelength laser, such as a DFB array. A DFB array is a single chip where a number of DFB chips, each having different wavelengths, are grown on the same substrate. It is also possible to integrate the DFB array with the arrayed waveguide grating.

In another preferred embodiment of the present invention, shown in FIG. 4, a number of frequency modulated sources, having wavelengths $\lambda_1, \lambda_2, \ldots, \lambda_n$, are combined into a single optical spectrum reshaper (OSR), using a beam combiner. Examples of beam combiners include a diffraction grating and a multifaceted prism, both of which are shown in FIG. 5. The output beam from the beam combiner contains a number of separate laser wavelengths. These co-propagating signals are passed through an optical spectrum reshaper (OSR) with a periodic transmission function (e.g., a multi-cavity etalon). The OSR is designed to have transmission peaks which correspond to the wavelengths of the frequency modulated input signals. For example, both the frequency modulated wavelengths and the OSR can have wavelengths that are on the same ITU wavelength grid having a 50 GHz separation between adjacent wavelengths. The OSR converts the frequency modulated signals into substantially amplitude modulated signals. The output of the OSR is sent into the transmission fiber. The operating point of each frequency modulated source is near the edge of transmission of the OSR, as shown in FIG. 3.

A wavelength locking circuit is described in the aforementioned U.S. patent application Ser. No. 10/680,607, in which the optical power of the source, $P_S$, and optical power transmitted through the discriminator, $P_T$, are measured using taps and the ratio $P_T/P_S$ is kept constant. According to one embodiment of the present invention, a wavelength sensitive tap may be integrated on the AWG for monitoring the power of the lasers before, $P_S$, and after, $P_T$, the input to the AWG. Note that athermal AWGs, for which the transmission does not change significantly with temperature over a wide range of temperatures, are possible to design. Optical power detectors, used to monitor $P_S$ and $P_T$, can be integrated on the same substrate as the AWG, to be used as part of the locking circuit described in the aforementioned U.S. patent application Ser. No. 10/680,607.

An alternative scheme for locking the lasers to the AWG transmission edges is to modulate each laser with a different low frequency dither tone, which is superimposed on the high frequency digital data. So $\lambda_1$ is modulated with a low frequency $f_1$, etc. The dither signal may be in the kHz frequency range, while the data is preferably at 10 Gb/s. At the output of the AWG, where the wavelengths are multiplexed together, a simple tap can simultaneously pick out the optical power at the different wavelengths and direct each wavelength to its own photodiode. The electrical signal from the photodiode will have frequency components at dither frequencies $f_1$, $f_2$, etc. corresponding to the power of the wavelengths $\lambda_1$, $\lambda_2$ after the AWG. Because each wavelength corresponds to a different frequency, the optical power in each channel can be separated and used independently as part of a locking circuit for that channel. An electrical filter can be used to separate the signals $f_1$, $f_2$, etc.

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A fiber optic system comprising:
    a multi-wavelength source adapted to generate frequency modulated signals having different wavelengths, $\lambda_1$, $\lambda_2$, ..., $\lambda_n$; and
    an arrayed waveguide grating adapted to convert the multiplicity of frequency modulated signals into a multiplicity of substantially amplitude modulated signals, and spatially combine the different wavelengths $\lambda_1$, $\lambda_2$, ..., $\lambda_n$.

2. A fiber optic system according to claim 1 wherein the multi-wavelength source is a distributed feedback laser array.

3. A fiber optic system according to claim 1 wherein the operating point of each wavelength $\lambda_k$ is near the edge of the transmission peak of the arrayed waveguide grating corresponding to that wavelength.

4. A fiber optic system according to claim 1 wherein the arrayed waveguide grating transmission profile is substantially Gaussian near each transmission peak.

5. A fiber optic system according to claim 4 wherein the slope of the transmission profile of the AWG is between 0.8 dB/GHz and 2 dB/GHz for each wavelength channel.

6. A fiber optic system according to claim 4 wherein the 3 dB bandwidth of the transmission profile of the AWG near each peak is 0.8 times to 1.2 times the bit rate of operation.

7. A fiber optic system according to claim 1 wherein the arrayed waveguide grating transmission profile is substantially flat-topped near each transmission peak.

8. A fiber optic system according to claim 7 wherein the local slope of arrayed waveguide grating transmission profile near each transmission peak is <0.2 dB/GHz.

9. A fiber optic system according to claim 8 wherein the slope of the transmission profile of the AWG is >2 dB/GHz near each wavelength channel.

10. A fiber optic system according to claim 1, further including a wavelength locking circuit adapted to wavelength lock the partially frequency modulated input signals at each wavelength $\lambda_k$ to the AWG by comparing (i) the optical power of the input signals to the AWG at each wavelength, with (ii) the optical power of the transmitted signals from the AWG at the same wavelength $\lambda_k$ and then adjusting the optical signal source to keep the ratio of the transmitted and input optical powers substantially constant for each wavelength.

11. A fiber optic system according to claim 10 wherein the wavelength locking circuit includes a multiplicity of optical taps at the input arm for each wavelength channel, a multiplicity of photodiodes to measure the output power of the tap, a wavelength selective tap at the output of the AWG, and a multiplicity of photodiodes to measure the output power of the wavelength selective tap at each wavelength.

12. A fiber optic system according to claim 10 wherein the optical powers are measured with integrated detectors.

13. A fiber optic system according to claim 10 wherein each input signal $\lambda_k$ is modulated with an additional dither tone at frequency $f_k$ to identify the wavelength channel, a tap at the output of the AWG to receive a portion of the power at the multiplicity of wavelength channels, and means for separating the signals at different frequency $f_k$.

14. A method for transmitting an optical signal through a fiber comprising:
    operating a multi-wavelength source so as to generate frequency modulated signals having different wavelengths, $\lambda_1$, $\lambda_2$, ..., $\lambda_n$;
    passing the frequency modulated signals through an arrayed waveguide grating so as to convert the frequency modulated signals into substantially amplitude modulated signals, and spatially combine the different wavelengths $\lambda_1$, $\lambda_2$, ..., $\lambda_n$; and
    passing the substantially amplitude modulated signals into the fiber.

15. A fiber optic system comprising:

a multi-wavelength source adapted to generate frequency modulated signals having different wavelengths, $\lambda_1, \lambda_2, \ldots, \lambda_n$; and a beam combiner adapted to spatially combine the signals having different wavelengths and pass them into a periodic optical spectrum reshaper (OSR) to generate a plurality of substantially amplitude modulated signals having wavelengths $\lambda_1, \lambda_2, \ldots, \lambda_n$.

16. A fiber optic system according to claim 15 wherein the beam combiner is a multi-faceted prism.

17. A fiber optic system according to claim 15 wherein the beam combiner is a diffraction grating.

* * * * *